US011345256B2

(12) United States Patent
Akutsu et al.

(10) Patent No.: US 11,345,256 B2
(45) Date of Patent: May 31, 2022

(54) BATTERY TEMPERATURE CONTROL SYSTEM

(71) Applicant: HONDA MOTOR CO., LTD., Tokyo (JP)

(72) Inventors: Shigemitsu Akutsu, Saitama (JP); Shinji Fujimoto, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/185,906

(22) Filed: Feb. 25, 2021

(65) Prior Publication Data

US 2021/0276454 A1    Sep. 9, 2021

(30) Foreign Application Priority Data

Mar. 3, 2020    (JP) .............................. JP2020-035674

(51) Int. Cl.
| | |
|---|---|
| *F01P 3/20* | (2006.01) |
| *F01P 7/16* | (2006.01) |
| *B60L 58/26* | (2019.01) |
| *F02F 1/16* | (2006.01) |
| *F01P 5/10* | (2006.01) |
| *F01P 7/14* | (2006.01) |

(52) U.S. Cl.
CPC ................ *B60L 58/26* (2019.02); *F01P 5/10* (2013.01); *F01P 7/16* (2013.01); *F02F 1/16* (2013.01); *F01P 2007/146* (2013.01); *F01P 2025/08* (2013.01); *F01P 2060/00* (2013.01)

(58) Field of Classification Search
CPC ........ F01P 3/20; F01P 7/16; F01P 5/10; F01P 7/14; F01P 7/026
See application file for complete search history.

(56) References Cited

U.S. PATENT DOCUMENTS

| | | | |
|---|---|---|---|
| 2010/0031646 A1* | 2/2010 | Iwase ...................... | F01N 11/00 60/277 |
| 2010/0050960 A1* | 3/2010 | Araki ...................... | F01P 7/165 123/41.1 |

(Continued)

FOREIGN PATENT DOCUMENTS

| | | |
|---|---|---|
| JP | 2010272289 A | 12/2010 |
| JP | 5835036 B2 | 12/2015 |

*Primary Examiner* — Long T Tran
(74) *Attorney, Agent, or Firm* — CKC & Partners Co., LLC

(57) ABSTRACT

The present invention provides a battery temperature control system having a simple configuration and capable of immediately raising a battery temperature by actively using heat generated by an internal combustion engine. The battery temperature control system includes: an engine cooling circuit in which a coolant in an internal combustion engine is circulated between a coolant jacket and a radiator by a coolant pump; an exhaust heat recovery circuit in which a coolant in an EGR cooler that recovers exhaust heat of the internal combustion engine flows; a battery cooler-destined branch circuit that is branched from the engine cooling circuit and goes toward an upstream side of the battery cooler in the battery cooling circuit 11; and a channel switching mechanism that selectively connects a downstream side of at least one of the exhaust heat recovery circuit or the battery cooler-destined branch circuit to the upstream side of the battery cooler in the battery cooling circuit.

7 Claims, 15 Drawing Sheets

(56) References Cited

U.S. PATENT DOCUMENTS

| | | | |
|---|---|---|---|
| 2012/0048504 A1* | 3/2012 | Park | B60H 1/14 |
| | | | 165/41 |
| 2015/0066263 A1* | 3/2015 | Abihana | F01P 7/164 |
| | | | 903/903 |
| 2016/0061091 A1* | 3/2016 | Hosokawa | F01P 3/20 |
| | | | 123/41.09 |
| 2017/0159545 A1* | 6/2017 | Onishi | F01P 7/16 |
| 2018/0163607 A1* | 6/2018 | Uto | F02B 29/0412 |

* cited by examiner

BATTERY TEMPERATURE CONTROL SYSTEM

This application is based on and claims the benefit of priority from Japanese Patent Application No. 2020-035674, filed on 3 Mar. 2020, the content of which is incorporated herein by reference.

BACKGROUND OF THE INVENTION

Field of the Invention

The present invention relates to a battery temperature control system.

Related Art

A technique for reducing electric power required to warm a vehicle-mounted battery has been proposed (see, e.g., Patent Document 1). According to the proposed technique, heat generated by a PTC (positive temperature coefficient) heater for warming an air-conditioning refrigerant and waste heat of a DC-DC converter are used to heat a refrigerant supplied to the vehicle-mounted battery. When the refrigerant is at about a medium temperature, the refrigerant in a battery refrigerant passage is circulated to the battery through a radiator, the DC-DC converter, and a charger.

A technique for cooling a battery using a vehicle-mounted air conditioning system has also been proposed (see, e.g., Patent Document 2). According to the proposed technique, the ratio of energy used to cool the battery is reduced when a large load is imposed on the air conditioning system so as not to reduce the effectiveness of the air conditioning system.

Patent Document 1: Japanese Unexamined Patent Application, Publication No. 2010-272289

Patent Document 2: Japanese Patent No. 5835036

SUMMARY OF THE INVENTION

According to the technique of Patent Document 1, the heat generated by the PTC heater for warming the air-conditioning refrigerant is mainly used for warming the vehicle-mounted battery, and the waste heat of the DC-DC converter is used secondarily. The technique of Patent Document 2 also uses the air conditioning system mainly for warming the battery. In a vehicle having an internal combustion engine, heat generated by the internal combustion engine can be used to warm the battery. Patent Document 1 discloses that the heat generated by the internal combustion engine is used to warm the battery under a certain condition. However, just like solid electrolyte lithium ion batteries that have advanced significantly in recent years, batteries that show high output characteristics in a higher battery temperature range than conventional lithium ion batteries are required to use the heat generated by the internal combustion engine more actively. Further, the battery is desirably heated immediately as much as possible. Such temperature rise is required to be achieved by a simple configuration.

The present invention has been made in view of the foregoing background, and an object thereof is to provide a battery temperature control system having a simple configuration and capable of immediately heating a battery by actively using heat generated by an internal combustion engine.

(1) A battery temperature control system, including: an engine cooling circuit (e.g., an engine cooling circuit 7 described later) in which a coolant in an internal combustion engine (e.g., an internal combustion engine 3 described later) is circulated between a coolant jacket and a radiator (e.g., a radiator 6 described later) by a coolant pump (e.g., a coolant pump 5 described later); an exhaust heat recovery circuit (e.g., an exhaust heat recovery circuit 9 described later) in which a coolant in an exhaust heat recovery device (e.g., an EGR cooler 4 described later) that recovers exhaust heat of the internal combustion engine flows; a battery cooling circuit (e.g., a battery cooling circuit 11 described later) in which a coolant in a battery cooler (e.g., a battery cooler 10 described later) that cools a battery (e.g., a battery 2 described later) of a vehicle having the internal combustion engine flows; a battery cooler-destined branch circuit (e.g., a battery cooler-destined branch circuit 12 described later) that is branched from the engine cooling circuit and goes toward an upstream side of the battery cooler in the battery cooling circuit; and a channel switching mechanism that selectively connects a downstream side of at least one of the exhaust heat recovery circuit or the battery cooler-destined branch circuit to the upstream side of the battery cooler in the battery cooling circuit.

(2) The battery temperature control system of (1), wherein the battery cooler-destined branch circuit is branched from a position downstream of the coolant pump and upstream of the coolant jacket in the engine cooling circuit and goes toward the upstream side of the battery cooler.

(3) The battery temperature control system of (1) or (2), including: an exhaust heat recovery device-destined branch circuit branched from a downstream side of the coolant jacket in the engine cooling circuit and goes toward an upstream side of the exhaust, heat recovery device in the exhaust heat recovery circuit; and a channel opening/closing mechanism provided in the exhaust heat recovery device-destined branch circuit.

(4) The battery temperature control system of any one of (1) to (3), further including: a battery coolant temperature sensor that detects a temperature of the coolant flowing through the engine cooling circuit; and a controller that controls an opening/closing operation of the channel opening/closing mechanism, wherein the controller opens the channel opening/closing mechanism when the temperature detected by the engine coolant temperature sensor exceeds a predetermined first threshold value.

(5) The battery temperature control system of (4), further including: a battery coolant temperature sensor that detects a temperature of the coolant flowing through the battery cooling circuit, wherein the controller also controls the switching operation of the channel switching mechanism, and connects the battery cooler-destined branch circuit to the upstream side of the battery cooler in the battery cooling circuit when the temperature detected by the battery coolant temperature sensor exceeds a predetermined second threshold value.

(6) The battery temperature control system of (3), wherein the channel opening/closing mechanism is a thermostat that opens or closes in accordance with an open/close threshold value determined by its characteristics, and opens when the temperature of the coolant flowing through the battery cooling circuit exceeds the open/close threshold value.

(7) The battery temperature control system of (6), wherein the channel switching mechanism is a thermostat that performs switching in accordance with a switching threshold value determined by its characteristics, and connects the battery cooler-destined branch circuit to the upstream side of the battery cooler when the temperature of the coolant flowing through the battery cooling circuit exceeds the switching threshold value.

In the battery temperature control system of (1), the channel switching mechanism blocks the engine coolant from flowing into the battery cooler when the temperature of the coolant flowing through the engine cooling circuit is low, and causes the coolant in the exhaust heat recovery circuit whose temperature is immediately raised just after the start of the engine to flow into the battery cooler. Thus, the temperature of the battery can be immediately raised.

In the battery temperature control system of (2), the coolant in the engine cooling circuit flows into the battery cooler when the coolant in the engine cooling circuit is suitable for heating the battery. Thus, the battery can be maintained at a suitable temperature.

In the battery temperature control system of (3), the coolant on the downstream of the coolant jacket is supplied to the exhaust heat recovery circuit through the channel opening/closing mechanism when the temperature of the coolant on the downstream side of the coolant jacket is in a suitable temperature range, thereby heating the coolant in the exhaust heat recovery circuit. This allows the coolant in the exhaust heat recovery circuit heated in this way to flow into the battery cooler so that the battery can be efficiently warmed.

In the battery temperature control system of (4), the controller opens the channel opening/closing mechanism at a suitable timing based on the temperature detected by the engine coolant temperature sensor to supply the coolant on the downstream side of the coolant jacket to the exhaust heat recovery device, thereby heating the coolant in the exhaust heat recovery circuit. This allows the coolant in the exhaust heat recovery circuit heated in this way to flow into the battery cooler at a suitable timing so that the battery can be efficiently warmed.

In the battery temperature control system of (5), the controller selects, at a suitable timing, a mode in which the battery cooler-destined branch circuit is connected to the upstream side of the battery cooler based on the temperature detected by the battery coolant temperature sensor. This avoids excessive heating of the battery caused by continuous supply of the relatively high-temperature coolant in the exhaust heat recovery circuit to the battery cooler, and the battery is maintained at a suitable temperature.

In the battery temperature control system of (6), a simple configuration including the thermostat allows the coolant on the downstream side of the coolant jacket to be supplied to the exhaust heat recovery device through the channel opening/closing mechanism when the temperature of the coolant on the downstream side of the coolant jacket is in a suitable temperature range, thereby heating the coolant in the exhaust heat recovery circuit. This allows the coolant in the exhaust heat recovery circuit heated in this way to flow into the battery cooler so that the battery can be efficiently warmed.

In the battery temperature control system of (7), a simple configuration including the thermostat avoids excessive heating of the battery caused by continuous supply of the relatively high-temperature coolant in the exhaust heat recovery circuit to the battery cooler, and the battery is maintained at a suitable temperature.

DETAILED DESCRIPTION OF THE INVENTION

Figure 1:
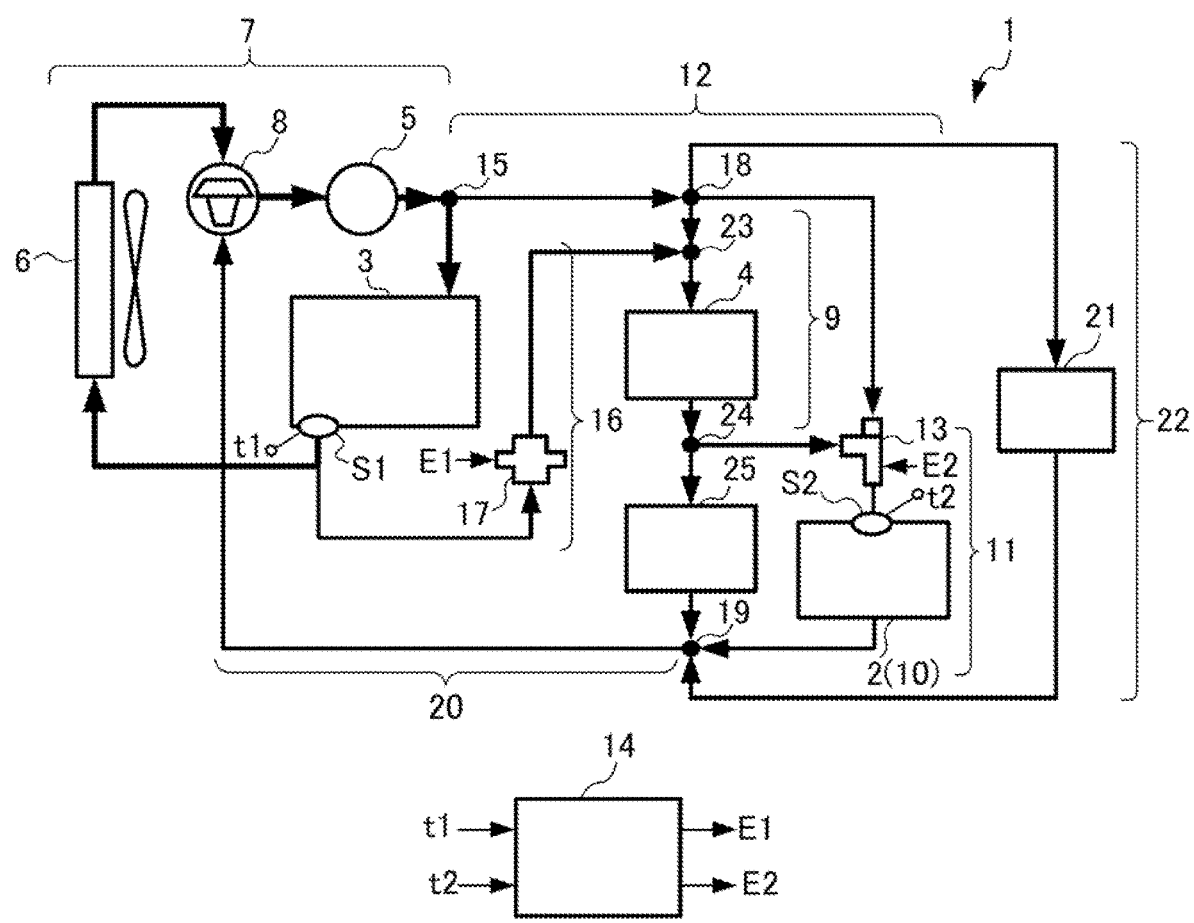
FIG. 1 is a system diagram illustrating a battery temperature control system as an embodiment of the present invention.

An embodiment of the present invention will be described below with reference to the drawings. FIG. 1 is a system diagram illustrating a battery temperature control system as an embodiment of the present invention. The battery temperature control system 1 of FIG. 1 is configured as a temperature control system especially for a battery of a hybrid vehicle. In FIG. 1, the battery temperature control system 1 as an embodiment of the present invention includes a battery 2 as a power source of a driving motor mounted on a hybrid vehicle (not shown). The battery 2 is configured to be able to use heat from a body of an internal combustion engine 3 as another power source of the vehicle, such as a gasoline engine, and heat from an EGR cooler 4 which is an exhaust heat recovery device that recovers exhaust heat of the internal combustion engine 3. Details will be described below.

An engine cooling circuit 7 is configured as a coolant passage in which a coolant in the internal combustion engine 3 is circulated between a coolant jacket formed in the internal combustion engine 3 and an external radiator 6 by a coolant pump 5. A thermostat 8 is arranged at a starting end of a branch channel upstream of the coolant pump 5 and downstream of the radiator 6 in the engine cooling circuit 7. The thermostat 8 is a valve that opens and closes in accordance with the temperature of a coolant passing through it. More specifically, the valve opens when the temperature of the coolant exceeds a threshold temperature set by the specifications thereof, and a coolant circulation circuit is formed in which the coolant flows through the coolant pump 5, the internal combustion engine 3 (a coolant jacket thereof), the radiator 6, and the thermostat 8 in this order, and then returns to the coolant pump 5. The valve closes when the temperature of the coolant is equal to or lower than the threshold temperature, and a cooling circuit that does not pass the radiator 6 is formed.

An EGR cooler 4 is provided to cool EGR gas in the internal combustion engine 3 by causing heat exchange between the EGR gas and the coolant introduced from the engine cooling circuit 7. The EGR cooler 4 is an exhaust heat recovery device that recovers a portion of exhaust heat of the internal combustion engine 3 in an EGR gas passage which is not shown. A passage of the coolant that goes within the EGR cooler 4 and pipes upstream and downstream of the passage constitute an exhaust heat recovery circuit 9.

The battery 2 is configured as a battery module, and has a coolant passage in which the coolant passes. A battery cooler 10 having the coolant passage is provided in the battery 2 configured as the battery module. The coolant passage of the battery cooler 10 and pipes upstream and downstream of the coolant passage constitute a battery cooling circuit 11.

A battery cooler-destined branch circuit 12 is branched from the engine cooling circuit 7 and goes toward an upstream side of the battery cooler 10 in the battery cooling circuit 11. A three-way valve 13 is provided as a channel switching mechanism that selectively connects a downstream side of at least one of the exhaust heat recovery circuit 9 and the battery cooler-destined branch circuit 12 to the upstream side of the battery cooler 10 in the battery cooling circuit 11. The three-way valve 13 performs channel switching in accordance with a control signal E2 from an ECU 14 which is a controller of the battery temperature control system 1.

In the present embodiment, the battery cooler-destined branch circuit 12 is branched from a branch channel 15 located downstream of the coolant pump 5 and upstream (at an inlet side) of the coolant jacket in the engine cooling circuit 7 and goes toward the upstream side of the battery cooler 10.

Further, in the present embodiment, an exhaust heat recovery device-destined branch circuit 16 is branched from the downstream side of the coolant jacket (internal combustion engine 3) in the engine cooling circuit 7 and goes toward the upstream side of the EGR cooler 4 in the exhaust heat recovery circuit 9. An on-off valve 17 is provided as a channel opening/closing mechanism in the exhaust heat recovery device-destined branch circuit 16. The on-off valve 17 performs a channel opening/closing operation in accordance with a control signal E1 from the ECU 14.

The function of the ECU 14 will be described in detail below in connection with the operation of the on-off valve 17 and the three-way valve 13. An engine coolant temperature sensor S1 that detects the temperature of the coolant flowing through the engine cooling circuit 7 is provided at an outlet of the internal combustion engine 3 (the coolant jacket thereof). The engine coolant temperature sensor S1 outputs a detection output t1 which is the detected temperature of the engine coolant. The ECU 14 opens the on-off valve 17 when the detection output t1 of the engine coolant temperature sensor S1 exceeds a predetermined first threshold value. Further, the ECU 14 closes the on-off valve 17 when the detection output t1 of the engine coolant temperature sensor S1 is equal to or less than the predetermined first threshold value.

A battery coolant temperature sensor S2 that detects the temperature of the coolant flowing through the battery cooling circuit 11 is provided at an inlet of the coolant passage of the battery cooling circuit 10. The battery coolant temperature sensor S2 outputs a detection output t2 which is the detected temperature of the battery coolant. The ECU 14 connects the battery cooler-destined branch circuit 12 to the upstream side of the battery cooler 10 in the battery cooling circuit 11 when the detection output t2 of the battery coolant temperature sensor S2 exceeds a predetermined second threshold value.

Connection between the circuits of the battery temperature control system 1 of FIG. 1 will be described in further detail below.

The branch channel 15 downstream of the coolant pump 5 has two branches, i.e., one toward the battery cooler-destined branch circuit 12 and one toward the inlet of the coolant jacket (internal combustion engine 3). The battery cooler-destined branch circuit 12 extends from one of the branches of the branch channel 15 to one of inlet ports of the three-way valve 13 via a branch channel 18 (one of branches thereof). An outlet port of the three-way valve 13 is connected to a coolant inlet of the battery 2 (battery cooler 10 thereof). A coolant outlet of the battery cooler 10 is connected to an inlet of the thermostat 8 via a converging channel 19. In this case, the junction with the inlet of the thermostat 8 communicates with a suction side of the coolant pump 5. A circuit extending from the converging channel 19 to an inlet of the thermostat 8 (a portion upstream of the valve) constitutes a return circuit 20 through which the coolant sent from a delivery side of the coolant pump 5 returns to the suction side of the coolant pump 5 via the inlet of the thermostat 6 (the portion upstream of the valve).

The battery temperature control system 1 of FIG. 1 includes a PDU cooling circuit 22 extending from the other branch of the branch channel 18 to the converging channel 19 via a PDU (Power Drive Unit) (a coolant passage thereof) 21.

Another branch of the branch channel 18 is connected to an inlet of the EGR cooler 4 via a converging channel 23. An indoor heater (a heat exchanger thereof) 25 is provided in a circuit extending from an outlet of the EGR cooler 4 to an inlet of the converging channel 19 via a branch channel 24. One of branches from an outlet of the branch channel 24 is connected to the other inlet port of the three-way valve 13.

Figure 6:
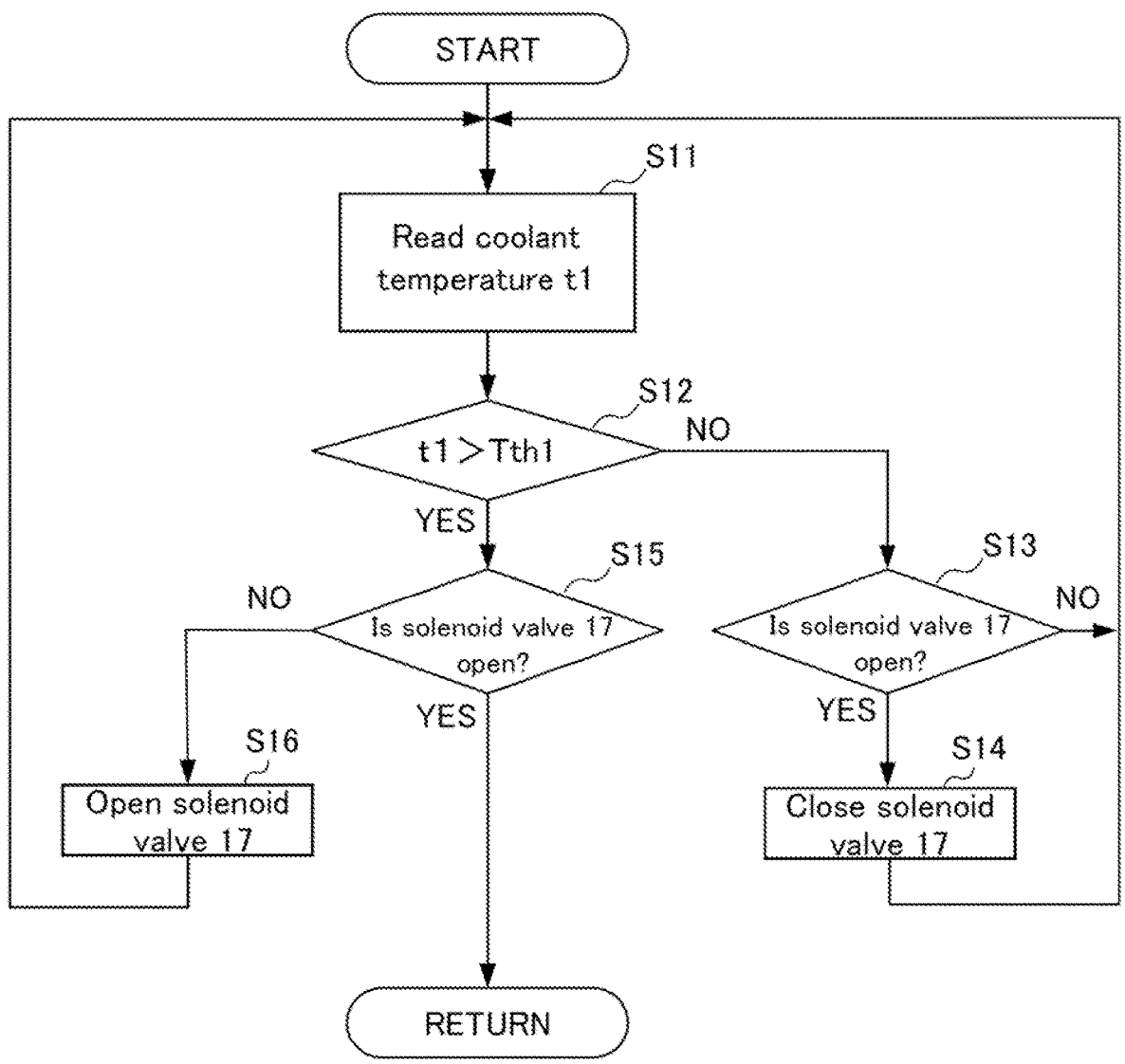
FIG. 6 is a flowchart illustrating an operation of a component of the battery temperature control system shown in FIG. 1.
Figure 7:
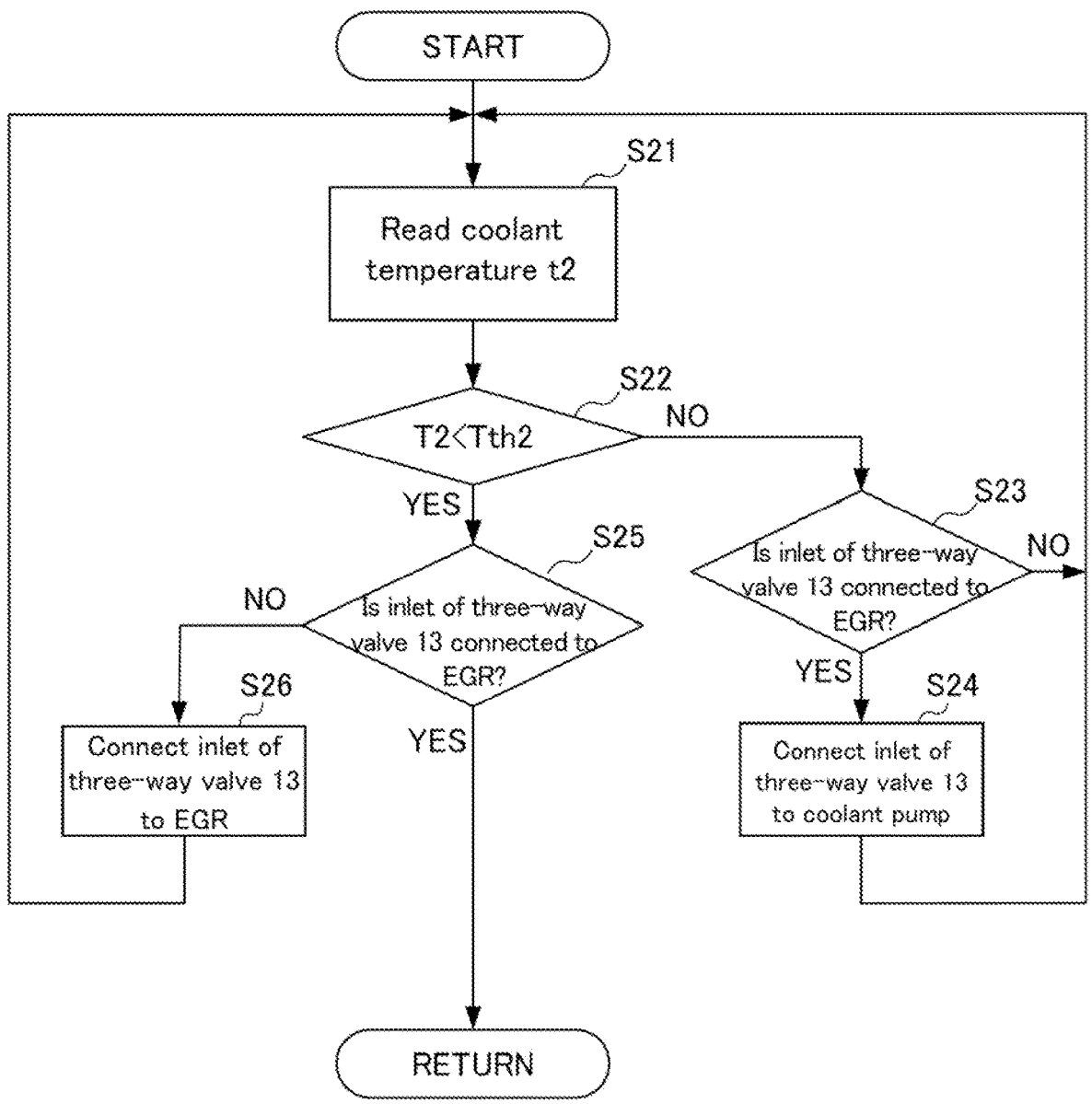
FIG. 7 is a flowchart illustrating an operation of another component of the battery temperature control system shown in FIG. 1.

Advantages of the battery temperature control system of FIG. 1 will be described below with reference to FIGS. 2 to 7. In FIGS. 2 to 5, the same components shown in FIG. 1 are designated by the same reference characters. In FIGS. 2 to 5, circuits in which the coolant can flow are drawn with solid lines, and circuits in which no coolant flows are drawn with broken lines. In the examples shown in FIGS. 2 to 5, a relatively low-temperature coolant that does not pass the coolant jacket of the internal combustion engine 3 steadily flows in the PDU cooling circuit 22. FIGS. 6 and 7 show flowcharts of operation.

Figure 2:
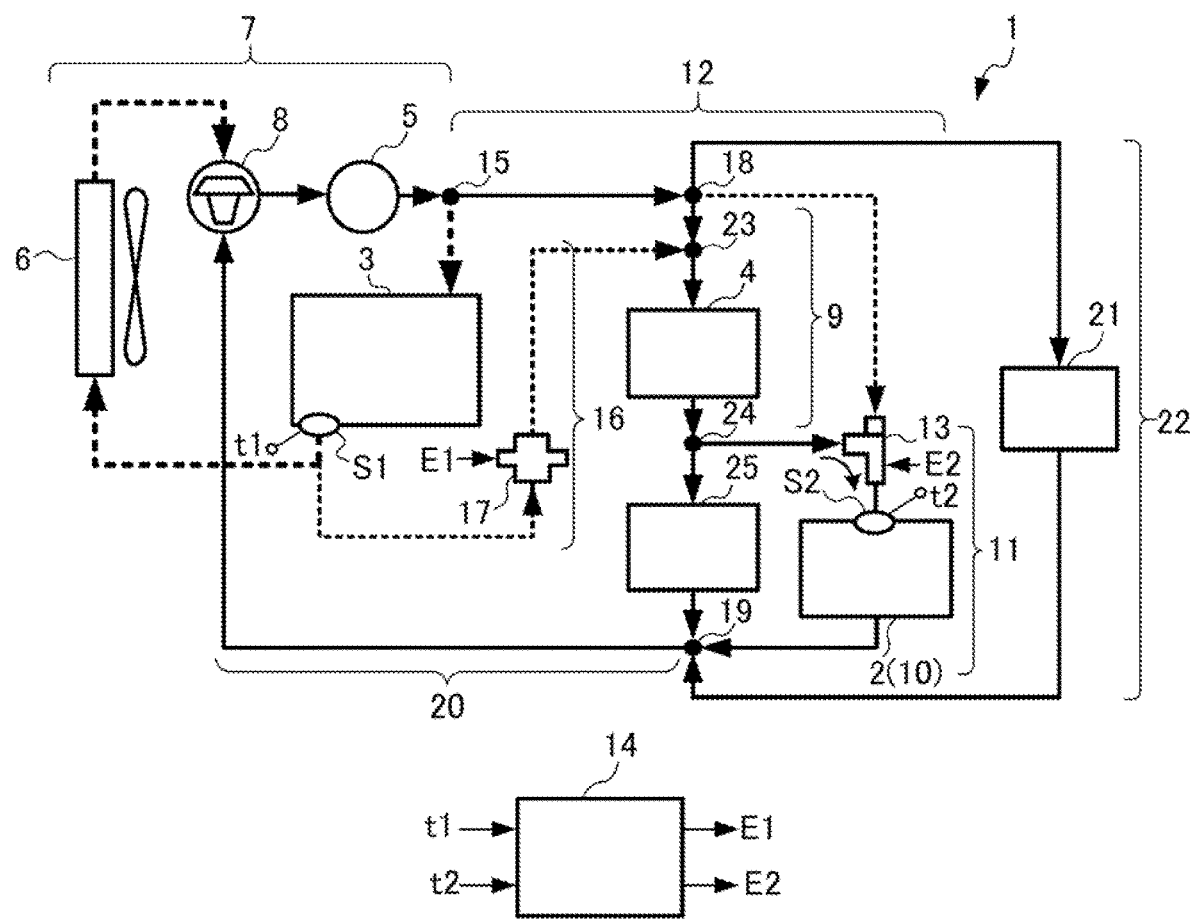
FIG. 2 is a diagram illustrating the battery temperature control system shown in FIG. 1 in an early stage of a warm-up.

FIG. 2 is a diagram illustrating the battery temperature control system 1 of FIG. 1 in an early stage of a warm-up. In the early stage of the warm-up of the internal combustion engine 3, the temperature of the coolant in the coolant jacket of the internal combustion engine 3 is low. The temperature of the coolant at this stage is lower than a threshold value of a valve operating temperature of the thermostat 8 according to the specifications thereof. Thus, the valve is closed and no coolant flows into the radiator 6.

In FIG. 2, this state is illustrated by thick broken lines in the engine cooling circuit 7. The coolant in the coolant jacket, which does not flow into the radiator 6, is immediately heated, and the internal combustion engine 3 is heated to a temperature suitable for good engine efficiency in a short time. In the early stage of the warm up of the internal combustion engine 3, control is performed to close the on-off valve 17 of the exhaust heat recovery device-destined branch circuit 16 to block the coolant whose temperature is still low from flowing into the EGR cooler 4. Specifically, this control is performed by the ECU 14.

FIG. 6 illustrates an example of a flowchart showing how the ECU 14 controls the on-off valve 17. The ECU 14 first reads the detection output t1 which is the temperature of the engine coolant detected by the engine coolant temperature sensor S1 (step S11). Then, the ECU 14 determines whether the read value t1 is equal to or greater than a predetermined first threshold value Tth1 (step S12). If it is determined in step S12 that the value t1 falls below the threshold value Tth1 (NO is selected in step S12), a determination is made at that time whether the on-off valve 17, which is a solenoid valve, is open or not (step S13). If it is determined in step S13 that the solenoid valve 17 is open (YES is selected in step S13), the solenoid valve 17 is closed (step S14), and the flow returns to step S11. If it is determined in step S13 that the solenoid valve 17 is closed (NO is selected in step S13), the flow returns to step S11. If it is determined in step S12 that the value t1 is equal to or greater than the threshold value Tth1 (YES is selected in step S12), a determination is made at that time whether the on-off valve 17 is open or not (step S15). If it is determined in step S15 that the solenoid valve 17 is open (YES is selected in step S15), the flow proceeds to RETURN. If it is determined in step S15 that the solenoid valve 17 is closed (NO is selected in step S15), the solenoid valve 17 is opened (step S16), and the flow returns to step S11.

In short, if the detection output t1, which is the temperature of the engine coolant detected by the engine coolant temperature sensor S1, is equal to or less than the predetermined first threshold value, the ECU 14 outputs a control command signal E1 to close the on-off valve 17. In FIG. 2, the exhaust heat recovery device-destined branch circuit 16 is drawn with broken lines to illustrate this state. In this state, the coolant in the engine cooling circuit 7 whose temperature is still low does not flow into the EGR cooler 4, and the coolant in the EGR cooler 4 is immediately heated.

Figure 3:
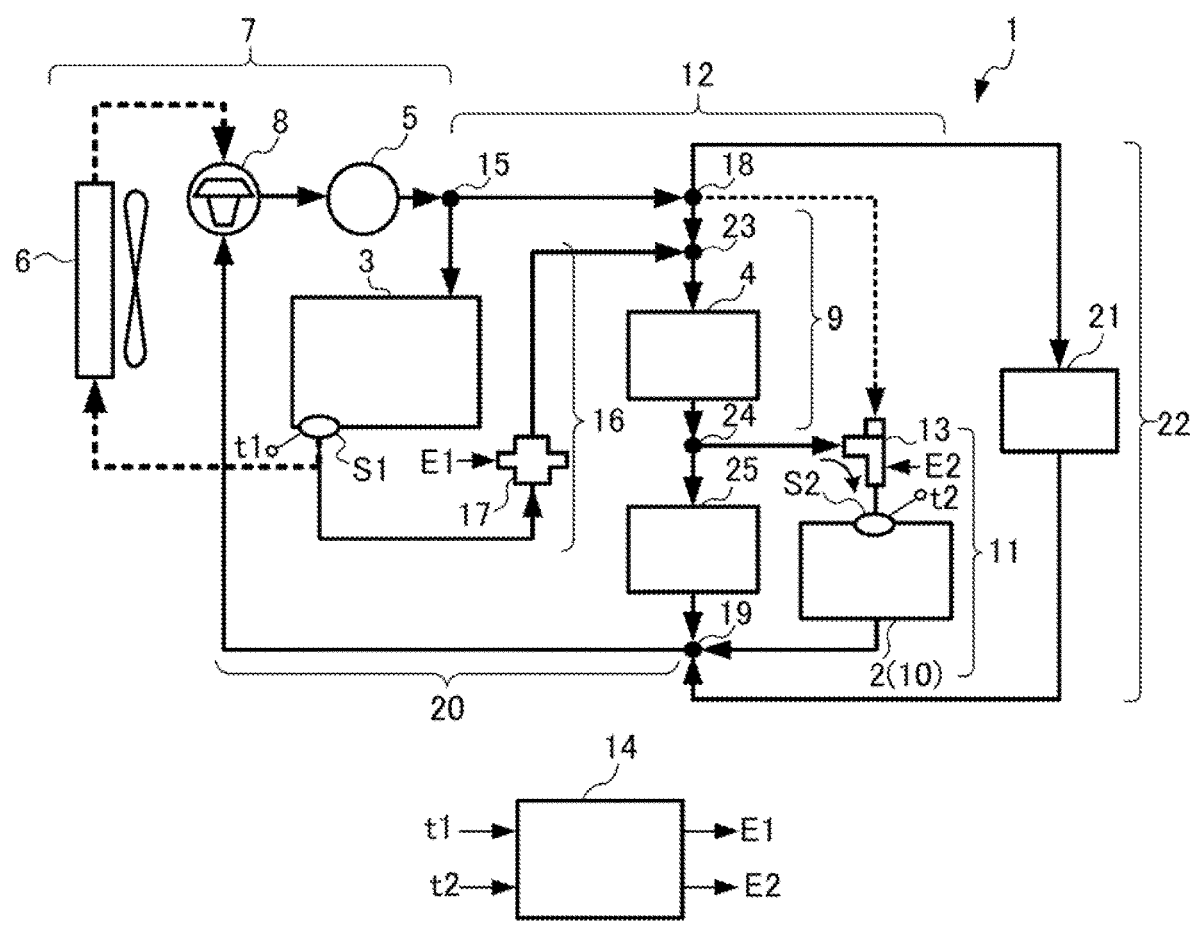
FIG. 3 is a diagram illustrating the battery temperature control system shown in FIG. 1 in a state from a later stage of the warm-up to a steady operation.

FIG. 3 is a diagram illustrating the battery temperature control system shown in FIG. 1 in a state from a later stage of the warm-up to a steady operation. This state is different from the state of the early stage of the warm-up shown in FIG. 2 in that the temperature of the coolant is raised, the on-off valve 17 which is the solenoid valve is switched to open, and the coolant is supplied from the converging channel 23 to the EGR cooler 4 through the exhaust heat recovery device-destined branch circuit 16 as described above with reference to FIG. 6. The temperature of the coolant is raised to such a degree that does not interfere with the temperature rise of the coolant in the EGR cooler 4, and then flows into the EGR cooler 4.

Figure 4:
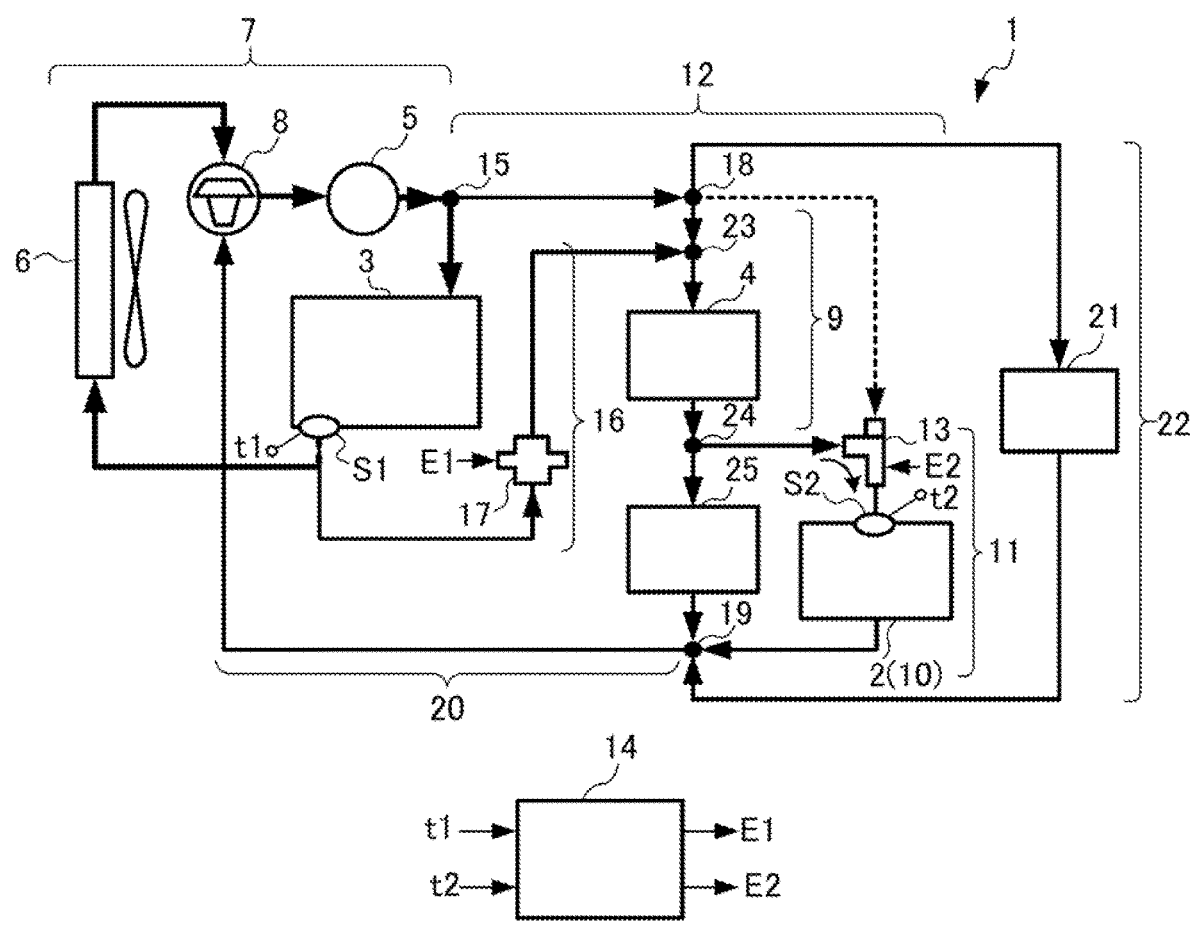
FIG. 4 is a diagram illustrating the battery temperature control system shown in FIG. 1 during the steady operation.

FIG. 4 is a diagram illustrating the battery temperature control system of FIG. 1 that has shifted to the steady operation. The temperature of the coolant in the engine cooling circuit 7 is raised to a value suitable for the steady operation, the valve of the thermostat 8 opens, the coolant flows into the radiator 6, and the temperature of the coolant is maintained.

Figure 5:
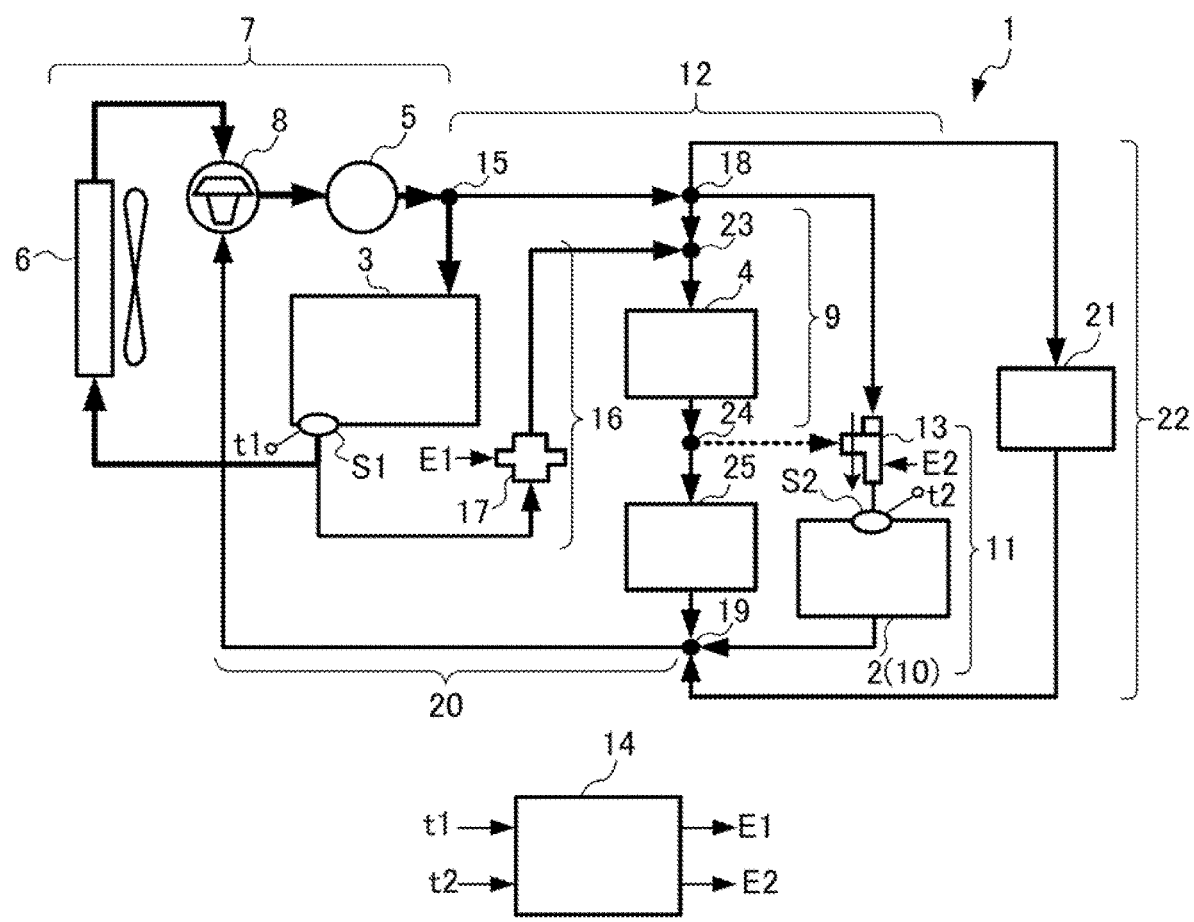
FIG. 5 is a diagram illustrating the battery temperature control system shown in FIG. 1 in which an engine is under a high load and a coolant temperature is high.

FIG. 5 is a diagram illustrating a state where the battery temperature control system 1 shown in FIG. 1 does not heat the battery 2 more than necessary with the coolant in the engine cooling circuit 7. If the detection output t2 which is the temperature of the battery coolant detected by the battery coolant temperature sensor S2 exceeds the predetermined second threshold value, the ECU 14 outputs a control command signal E2, and the coolant in the battery cooler-destined branch circuit 12 flows into the battery cooler 10 via the three-way valve 13. Specifically, this control is performed by the ECU 14.

If the temperature of the engine coolant exceeds a temperature suitable for heating the battery 2, an operation mode is controlled so that the coolant is blocked from flowing into the three-way valve 13 through one of the inlet ports thereof. Specifically, this control is performed by the ECU 14.

FIG. 7 illustrates an example of a flowchart showing how the ECU 14 controls the three-way valve 13. The ECU 14 first reads the detection output t2 which is the temperature of the battery coolant detected by the battery coolant temperature sensor S2 (step S21). Then, the ECU 14 determines whether the read value t2 falls below a predetermined second threshold value Tth2 (step S22). If it is determined in step S22 that the value t2 is equal to or greater than the threshold value Tth2 (NO is selected in step S22), a determination is made at that time whether the three-way valve 13 is connected to the EGR cooler (abbreviated to "EGR" in the flowchart) or not (step S23). If it is determined in step S23 that the three-way valve 13 is connected to the EGR cooler (YES is selected in step S23), the three-way valve 13 is switched to be connected to the delivery side of the coolant pump 5 (abbreviated to "coolant pump" in the flowchart) (step S24), and the flow returns to step S21. If it is determined in step S23 that the three-way valve 13 is not connected to the EGR cooler (NO is selected in step S23), the flow returns to step S21. If it is determined in step S22 that the value t2 falls below the threshold value Tth2 (YES is selected in step S22), a determination is made at that time whether the three-way valve 13 is connected to the EGR cooler or not (step S25). If it is determined in step S25 that the three-way valve 13 is connected to the EGR cooler (YES is selected in step S25), the flow proceeds to RETURN. If it is determined in step S25 that the three-way valve 13 is not connected to the EGR cooler (NO is selected in step S25), the three-way valve 13 is switched to be connected to the EGR cooler (step S26), and the flow returns to step S21.

In short, if the detection output t2, which is the temperature of the battery coolant detected by the battery coolant temperature sensor S2, is equal to or greater than the predetermined second threshold value, the ECU 14 outputs the control command signal E2 to block the coolant from flowing into the three-way valve 13 through one of the inlet ports thereof. In FIG. 5, a circuit extending from the branch channel 24 (one of branches thereof) to the one of the inlet ports of the three-way valve 13 is drawn with a broken line to illustrate this state. In this state, the coolant in the engine cooling circuit 7 whose temperature is high and unsuitable for controlling the battery 2 does not flow into the battery cooler 10. This can avoid the battery 2 from being heated more than necessary. Thus, if the battery 2 is an all solid lithium ion battery, the battery can function in a temperature range where favorable output characteristics are exhibited by effectively using the heat of the internal combustion engine 3.

Figure 8:
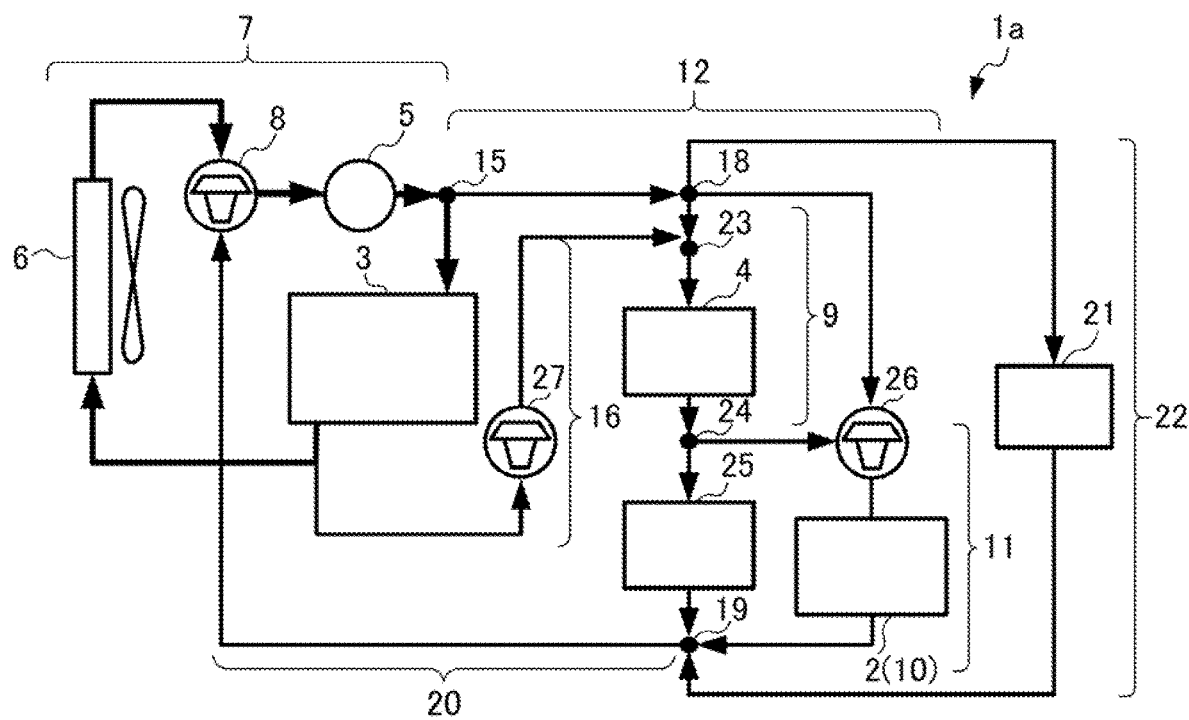
FIG. 8 is a system diagram illustrating a battery temperature control system as another embodiment of the present invention.
Figure 9:
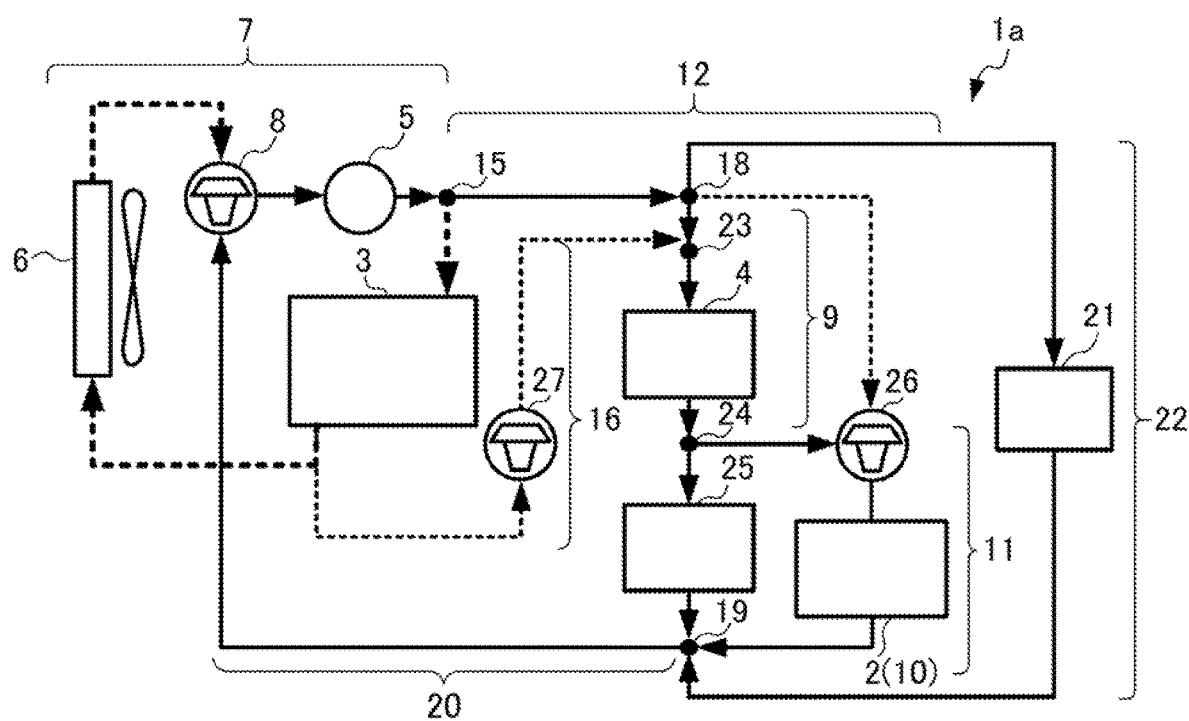
FIG. 9 is a diagram illustrating the battery temperature control system shown in FIG. 8 in an early stage of a warm-up.
Figure 10:
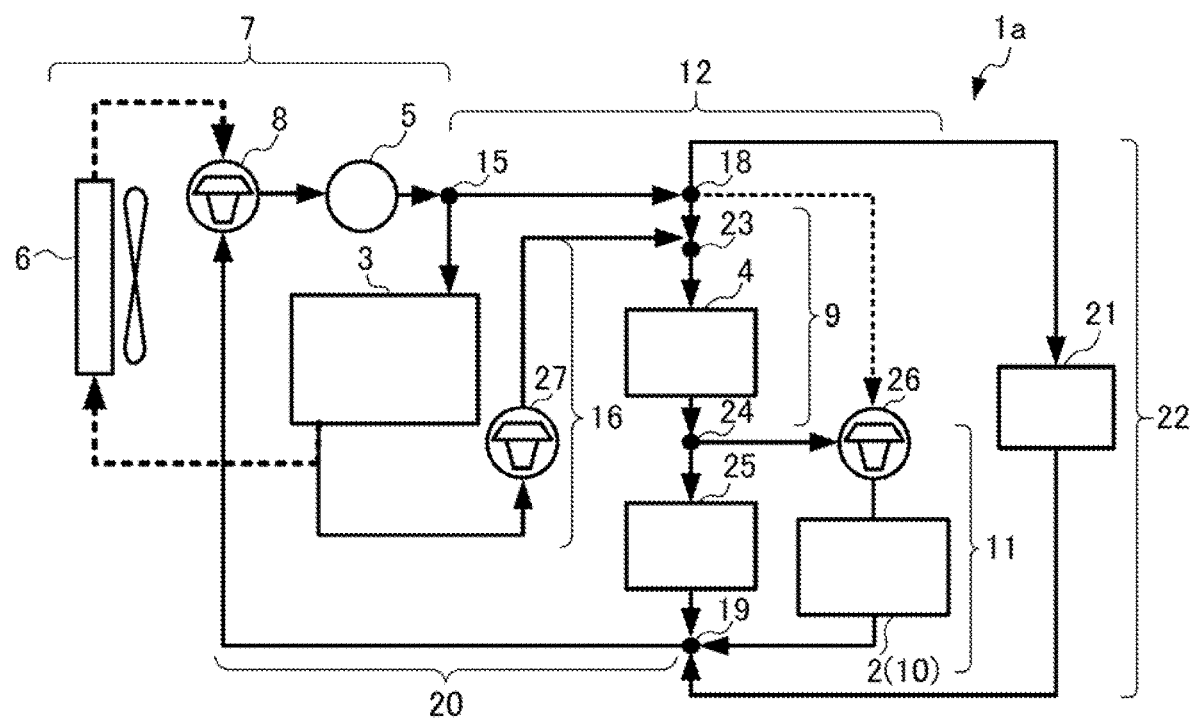
FIG. 10 is a diagram illustrating the battery temperature control system shown in FIG. 8 in a state from a later stage of the warm-up to a steady operation.
Figure 11:
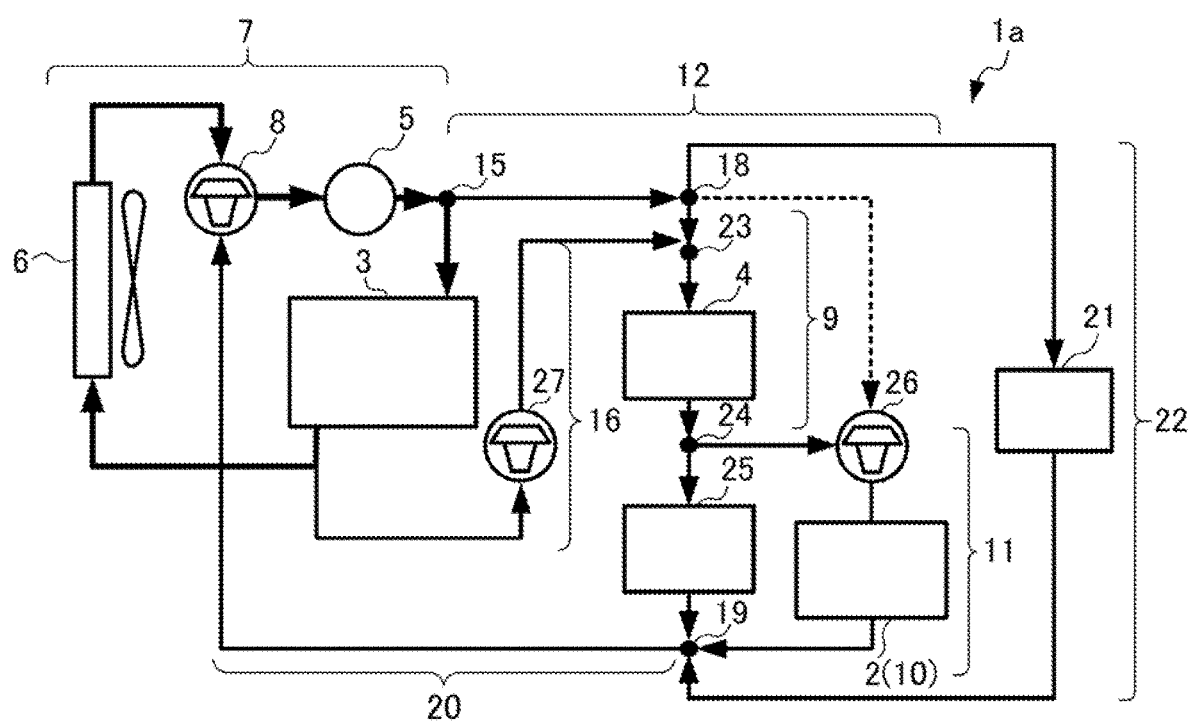
FIG. 11 is a diagram illustrating the battery temperature control system shown in FIG. 8 during the steady operation.
Figure 12:
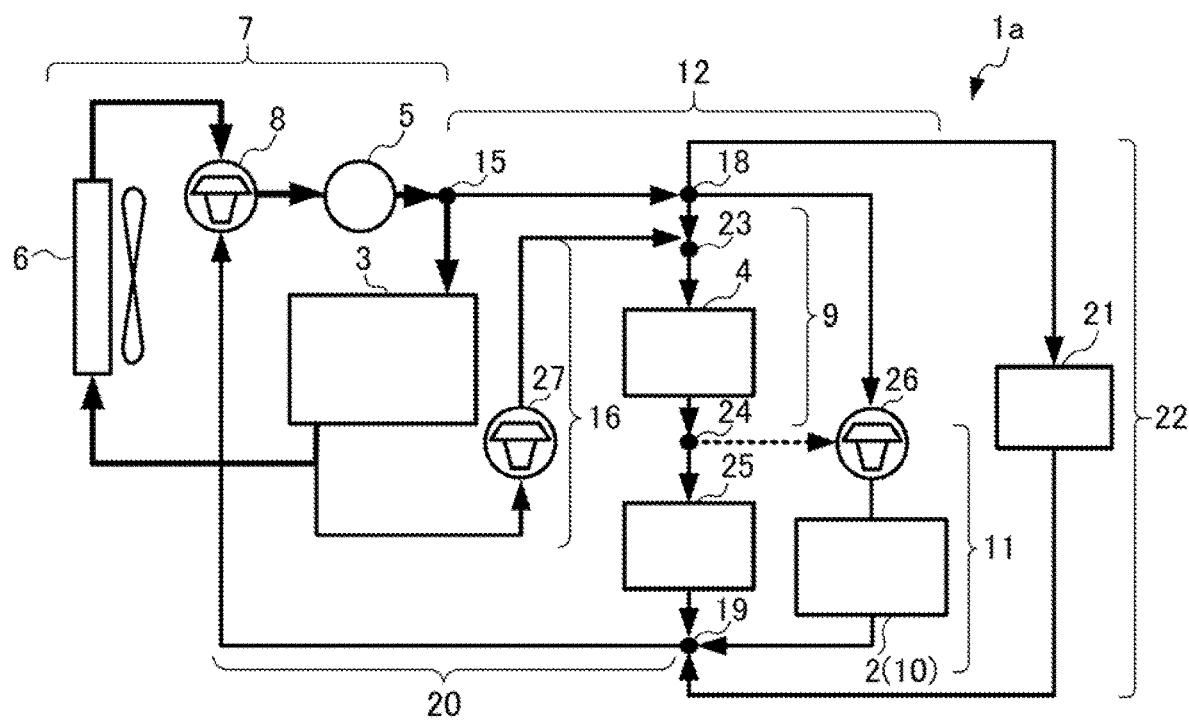
FIG. 12 is a diagram illustrating the battery temperature control system shown in FIG. 8 in which an engine is under a high load and a coolant temperature is high.

FIG. 8 is a system diagram illustrating a battery temperature control system as another embodiment of the present invention. Unlike the above-described battery temperature control system 1, a battery temperature control system 1a of FIG. 8 includes thermostats 26, 27 in place of the three-way valve 13 and the on-off valve 17, which are both solenoid valves, of the battery temperature control system 1. The three-way valve 13 and the on-off valve 17, which are solenoid valves, are operated in accordance with the coolant temperatures respectively detected by the temperature sensors under the control of the ECU 14. However, in the battery temperature control system 1a of FIG. 8, opening/closing of valves and three-way switching are performed in accordance with threshold values of temperatures of the thermostats 26, 27 set by their specifications.

FIGS. 9 to 12 are diagrams illustrating an operation of the battery temperature control system 1a shown in FIG. 8. FIGS. 9 to 12 correspond to FIGS. 2 to 5 illustrating the operation of the battery temperature control system 1 shown in FIG. 1. In FIGS. 9 to 12, the same components shown in FIGS. 2 to 5 are designated by the same reference characters. Also in FIGS. 9 to 12, circuits in which the coolant can flow are drawn with solid lines, and circuits in which no coolant flows are drawn with broken lines. Based on the above-described correspondence between FIGS. 9 to 12 and FIGS. 2 to 5, the description of the operation with reference to FIGS. 2 to 5 will be quoted.

Figure 13:
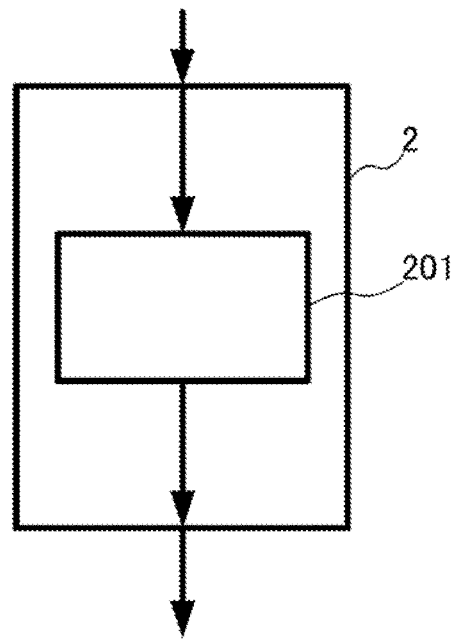
FIG. 13 is a conceptual diagram illustrating an example of a battery module applied to the battery temperature control system as an embodiment of the present invention.
Figure 14:
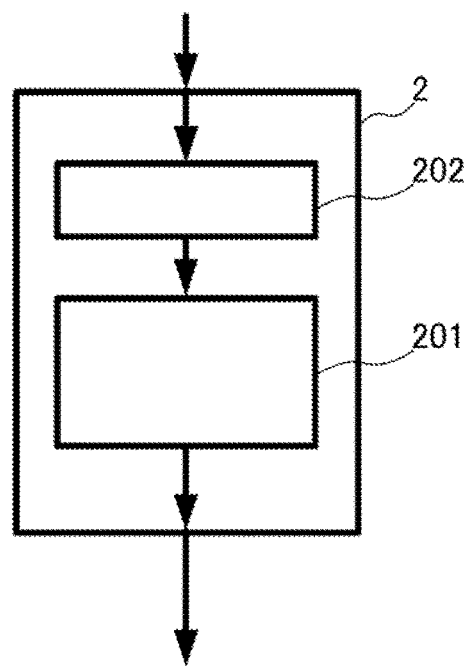
FIG. 14 is a conceptual diagram illustrating another example of a battery module applied to the battery temperature control system as an embodiment of the present invention.
Figure 15:
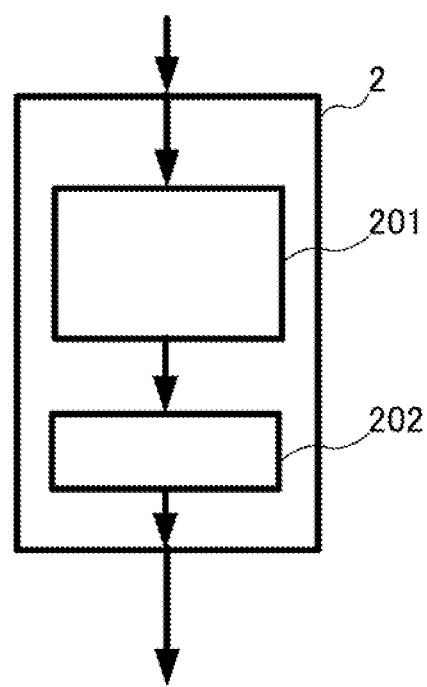
FIG. 15 is a conceptual diagram illustrating still another example of a battery module applied to the battery temperature control system as an embodiment of the present invention.

FIGS. 13 to 15 are conceptual diagrams illustrating various examples of a battery 2 which is configured as a battery module. The battery 2 of FIG. 13 includes a stacked battery cell 201 placed in a housing, and a coolant flows through the battery as indicated by arrows. The battery 2 of FIG. 14 includes a DC-DC converter 202 placed in a housing. A stacked battery cell 201 is placed in the housing, and a coolant flows through the battery as indicated by arrows. The coolant flows from the outside of the housing to the DC-DC converter 202 and the stacked battery cell 201 in this order. The battery 2 of FIG. 15 includes a DC-DC converter 202 placed in a housing. A stacked battery cell 201 is placed in the housing, and a coolant flows through the battery as indicated by arrows. The coolant flows from the outside of the housing to the stacked battery cell 201 and the DC-DC converter 202 in this order.

Figure 16:
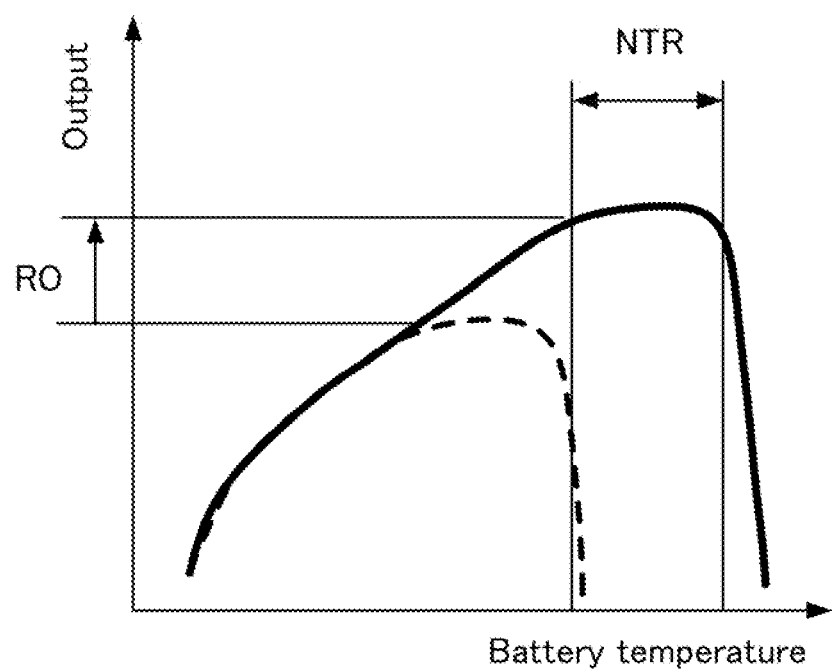
FIG. 16 is a graph showing output characteristics of a battery applied to the battery temperature control system as an embodiment of the present invention.

FIG. 16 is a graph illustrating a comparison between a conventional lithium ion battery and an all solid lithium ion battery in terms of output characteristics with respect to temperature. In FIG. 16, a dotted curve represents the characteristics of the conventional lithium ion battery, and a solid curve represents the characteristics of the all solid lithium ion battery. As apparent from the comparison between their characteristic curves, the all solid lithium ion battery can produce a greater output in a higher battery temperature range than the conventional lithium ion battery. In this graph, a temperature range "NTR" is a temperature control range where the all solid lithium ion battery is normally used. The output of the all solid lithium ion battery in this range is larger than the output of the conventional lithium ion battery in a temperature range where the lithium ion battery is normally used by about "RO". Thus, suitably raising the temperature of the all solid lithium ion battery by effectively using the heat of the internal combustion engine 3 makes it possible to achieve particularly remarkable output characteristics with a simple configuration when the all solid lithium ion battery is used as a power source of a hybrid vehicle.

The battery temperature control system of the present embodiment provides the following advantages.

(1) In one embodiment of the battery temperature control system, the on-off valve 17 blocks the coolant on the downstream side of the coolant jacket from flowing into the EGR cooler 4 when the temperature of the coolant on the downstream side of the coolant jacket is low, and causes the coolant in the exhaust heat recovery circuit 9 (EGR cooler 4) whose temperature is immediately raised just after the start of the engine to flow into the battery cooler 10. Thus, the temperature of the battery 2 can be immediately raised.

(2) In one embodiment of the battery temperature control system, the coolant on the downstream side of the coolant jacket is supplied to the EGR cooler 4 through the on-off valve 17 when the temperature of the coolant on the downstream side of the coolant jacket is in a suitable temperature range, thereby heating the coolant in the exhaust heat recovery circuit 9. This allows the coolant in the exhaust heat recovery circuit 9 heated in this way to flow into the battery cooler 10 so that the battery 2 can be efficiently warmed.

(3) In one embodiment of the battery temperature control system, the ECU 14 selects, at a suitable timing, a mode in which the battery cooler-destined branch circuit 12 is connected to the upstream side of the battery cooler 10 based on the detected temperature t2 of the battery coolant temperature sensor S2. This can avoid excessive heating of the battery caused by continuous supply of the relatively high-temperature coolant in the exhaust heat recovery circuit 9 to the battery cooler 10, and the battery is maintained at a suitable temperature.

(4) In another embodiment of the battery temperature control system, a simple configuration including the thermostats 26, 27 allows the coolant on the downstream side of the coolant jacket to be supplied to the EGR cooler 4 through the channel opening/closing mechanism when the temperature of the coolant on the downstream side of the coolant jacket is in a suitable temperature range, thereby heating the coolant in the exhaust heat recovery circuit 9. This allows the coolant in the exhaust heat recovery circuit 9 heated in this way to flow into the battery cooler 10 so that the battery 2 can be efficiently warmed.

(5) In another embodiment of the battery temperature control system, a simple configuration including the thermostats 26, 27 avoids excessive heating of the battery caused by continuous supply of the relatively high-temperature coolant in the exhaust heat recovery circuit 9 to the battery cooler 10, and the battery is maintained at a suitable temperature.

The embodiment of the present invention has just been described as examples of the present invention. However, the present invention is not limited to the embodiment. Modifications can be made to the detailed configuration of the present invention as needed within the scope of the present invention. For example, in the example of FIG. 8, the three-way valve 13 and on-off valve 17 of the embodiment of FIG. 1, which are both solenoid valves, have been replaced with the thermostats. However, either one of the valves may be replaced with the thermostat.

EXPLANATION OF REFERENCE NUMERALS 1, 1a Battery Temperature Control System
2 Battery 3 Internal Combustion Engine
4 EGR cooler (exhaust heat Recovery Device)
5 Coolant Pump
6 Radiator
7 Engine Cooling Circuit
8, 26, 27 Thermostat
9 Exhaust Heat Recovery Circuit
10 Battery Cooler
11 Battery Cooling Circuit
12 Battery Cooler-destined Branch Circuit
13 Three-Way Valve
14 ECU
15 Branch Channel
16 Exhaust Heat Recovery Device-destined Branch Circuit
17 On-off Valve
18 Branch Channel
19 Converging Channel
20 Return Circuit
21 PDU
22 PDU Cooling Circuit
23 Converging Channel
24 Branch Channel
25 Indoor Heater
S1 Engine Coolant Temperature Sensor
S2 Battery Coolant Temperature Sensor

What is claimed is:

1. A battery temperature control system, comprising:
an engine cooling circuit in which a coolant in an internal combustion engine is circulated between a coolant jacket and a radiator by a coolant pump;
an exhaust heat recovery circuit in which a coolant in an exhaust heat recovery device that recovers exhaust heat of the internal combustion engine flows;
a battery cooling circuit in which a coolant in a battery cooler that cools a battery of a vehicle having the internal combustion engine flows;
a battery cooler-destined branch circuit that is branched from the engine cooling circuit and goes toward an upstream side of the battery cooler in the battery cooling circuit;
a channel switching mechanism that selectively connects a downstream side of at least one of the exhaust heat recovery circuit or the battery cooler-destined branch circuit to the upstream side of the battery cooler in the battery cooling circuit;
an exhaust heat recovery device-destined branch circuit branched from a downstream side of the coolant jacket in the engine cooling circuit and goes toward an upstream side of the exhaust heat recovery device in the exhaust heat recovery circuit; and
a channel opening/closing mechanism provided in the exhaust heat recovery device-destined branch circuit.

2. The battery temperature control system according to claim 1, wherein the battery cooler-destined branch circuit is branched from a position downstream of the coolant pump and upstream of the coolant jacket in the engine cooling circuit and goes toward the upstream side of the battery cooler.

3. The battery temperature control system according to claim 1, further comprising:
an engine coolant temperature sensor that detects a temperature of the coolant flowing through the engine cooling circuit; and
a controller that controls an opening/closing operation of the channel opening/closing mechanism,
wherein the controller opens the channel opening/closing mechanism when the temperature detected by the engine coolant temperature sensor exceeds a predetermined first threshold value.

4. The battery temperature control system according to claim 3, further comprising:
a battery coolant temperature sensor that detects a temperature of the coolant flowing through the battery cooling circuit,
wherein the controller also controls a switching operation of the channel switching mechanism, and connects the battery cooler-destined branch circuit to the upstream side of the battery cooler in the battery cooling circuit when the temperature detected by the battery coolant temperature sensor exceeds a predetermined second threshold value.

5. The battery temperature control system according to claim 1,
wherein the channel opening/closing mechanism is a thermostat that opens or closes in accordance with an open/close threshold value determined by its characteristics, and opens when the temperature of the coolant flowing through the battery cooling circuit exceeds the open/close threshold value.

6. The battery temperature control system according to claim 5,
wherein the channel switching mechanism is a thermostat that performs switching in accordance with a switching threshold value determined by its characteristics, and connects the battery cooler-destined branch circuit to the upstream side of the battery cooler when the temperature of the coolant flowing through the battery cooling circuit exceeds the switching threshold value.

7. The battery temperature control system according to claim 1,
wherein the battery cooling circuit is configured to cools a battery of an all-solid-state battery.

* * * * *